Nov. 28, 1967  R. J. FLEMING ET AL  3,354,512
SWAB MAKING MACHINE
Filed Aug. 14, 1964  7 Sheets-Sheet 1

FIG. 1

INVENTORS
ALFRED R. COZZOLINO
ROBERT J. FLEMING

ATTORNEY

FIG. 2

INVENTORS
ALFRED R. COZZOLINO
ROBERT J. FLEMING

Arthur A. March
ATTORNEY

INVENTORS
ALFRED R. COZZOLINO
ROBERT J. FLEMING

*Arthur A. Ward*
ATTORNEY

United States Patent Office

3,354,512
Patented Nov. 28, 1967

3,354,512
SWAB MAKING MACHINE
Robert J. Fleming and Alfred R. Cozzolino, Wayne, N.J., assignors to Swabettes, Inc., Wayne, N.J., a corporation of New Jersey
Filed Aug. 14, 1964, Ser. No. 389,663
10 Claims. (Cl. 19—145.3)

This invention relates to a swab making machine and more particularly to a machine for automatically applying tufts of cotton to the ends of individual sticks and for forming these tufts into desired configurations.

In the manufacture of cotton-tipped swabs, a tuft of cotton must be attached to one or both ends of a stick of suitable size. The quantity of cotton applied to each stick must be substantially the same and it must fully encase the end of the stick so that, in normal use, only the cotton will come into contact with the surface being swabbed. The problem of handling both the stick and the cotton so that the appropriate amount of the latter will be attached and wrapped or formed into the proper conformation involves special considerations and delicate material-handling techniques.

Heretofore, various machines have been proposed for producing cotton-tipped swabs including machines provided with mechanism for conveying the sticks to the point of cotton application and separate pressure means for rotating the sticks. However, these machines were costly and a delicate and difficult to maintain balance was required between the mechanism provided for rotating the sticks and the means for conveying the sticks. In many instances the desired result of obtaining a simple and complete enwrapment with cotton of the terminals of each stick was not accomplished. Furthermore, mechanism was provided to apply the cotton to the stick under pressure which was constantly subject to variation because of the lack of tolerances and the difference in the sizes and condition of the sticks. Therefore, an undesirable result ensued in that the cotton was not evenly and equally distributed around the terminals of the stick.

It is therefore the object of the present invention to provide an automatic machine for making swabs in which the means for conveying the sticks to the point of cotton application to also comprise the means for rotating the sticks.

It is another object of the present invention to provide means for rotating the stick at a constant predetermined rate without using pressure thereon.

It is a further object of the present invention to provide for the complete enwrapment of the terminals of the stick with cotton without using undesirable pressure.

It is still another and further object of the present invention to provide a machine in which the cotton is applied in equal amounts completely and evenly enwrapping the terminals of the stick with cotton.

A feature of the present invention is the provision of a swab making machine having all the aforesaid advantages which is nevertheless comparatively economical to manufacture and relatively simple to operate and maintain.

Further objects and features are set forth in greater detail in the following specification taken in conjunction with the drawings in which.

Figure 1:
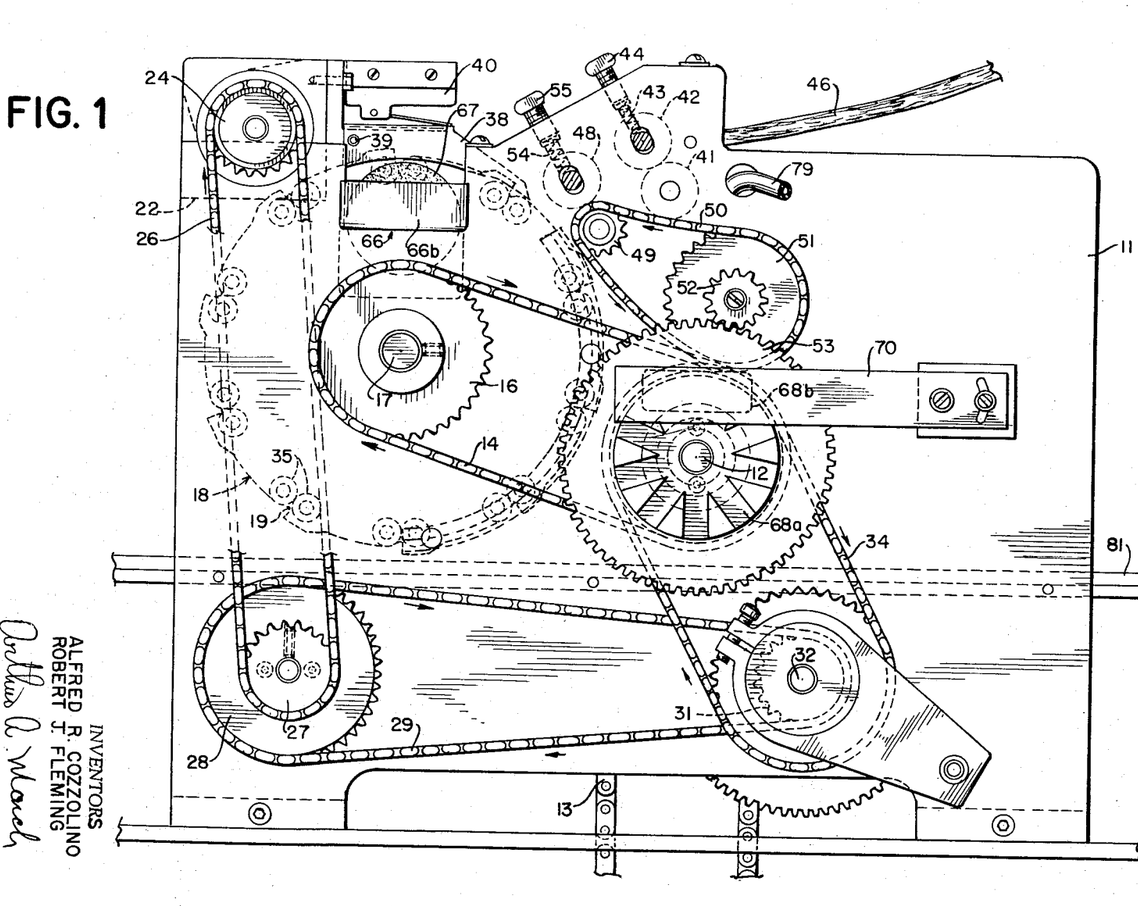
FIG. 1 is a view of one side of the machine of this invention.

FIG. 1 shows one plate 11 of a pair of side plates in which the driving and operating shafts of the machine are journalled by means of suitable bearings. The main drive shaft, which is indicated by reference numeral 12, is operated by means of a sprocket chain 13 from a motor (not shown). The drive shaft has several sprocket wheels mounted on it, one of which operates a chain 14 that engages a sprocket 16 rigidly mounted on a rotatable shaft 17. This shaft drives a rotary member 18 which is behind the plate 11 and has a plurality of recesses or receptacles 19 for receiving individual swab sticks 21. These sticks are supplied from a hopper 22 by means of supply apparatus in the form of a stick supply wheel 23 connected to a sprocket 24 by a chain 26. The chain 26 is in turn driven by a series of sprockets 27, 28 and 31 and chain 29. Sprocket 31 is mounted on the shaft 32 and is rigidly affixed to sprocket 33 driven by a chain 34 which is operated by one of the sprocket wheels on the main drive shaft 12.

In accordance with the present invention the rotary member 18 is provided around its perimeter with pairs of rollers 35 which rotate in the same direction and which cause the sticks 21 to revolve independently of any other force as they rest within the recesses.

As a consequence, integral means is provided which convey the sticks to the point of enwrapment by cotton as hereinafter described while continuously and steadily rotating them. The revolving sticks 21 are moved by the rotary member 18 across the surface of a smaller wheel 36 rotatably mounted to dip into a container 37 of liquid glue or cement. The wheel 36 rotates continuously and, in conjunction with the rotation of the sticks 21, provides a neat, even coating of adhesive, or glue, on the end of each stick.

As the sticks 21 move past the position at which they are coated with glue, they slide under a feeler arm 38 pivotally mounted on a pin 39. The arm of a microswitch 40 engages the arm 38 to detect whether there is a stick 21 in each recess 19 or not and to stop the motor that drives the main shaft 12 if no stick is present.

After the rotary member 18 carries the rotating sticks out from under the arm 38, they arrive at a location adjacent to the cotton feeding rollers. These rollers include a first pair 41 and 42, of which roller 42 is driven intermittently, by means not shown in this figure, and roller 41 is free to rotate, but is held against the surface of the roller 42 by a spring 43 controlled by a set screw 44. The intermittent rotation of this first pair of rollers alternately moves a loose strand 46 of cotton, or other suitable fibrous material forward, to be picked up by a second pair of rollers 47 and 48. The latter rotates continuously so that they pull off a tuft of cotton each time the rollers 41 and 42 stop. The roller 47 is connected to a sprocket 49 driven by a chain 50 which, in turn, is driven by a sprocket 51 connected to a gear 52 in mesh with a gear 53 on the main drive shaft 12. Roller 48 is resiliently pressed against the roller 47 by a spring 54 controlled by a set screw 55. While only four rollers are shown in this figure, a like number of rollers directly behind the ones shown is provided for feeding cotton tufts to the other end of each stick.

Figure 2:
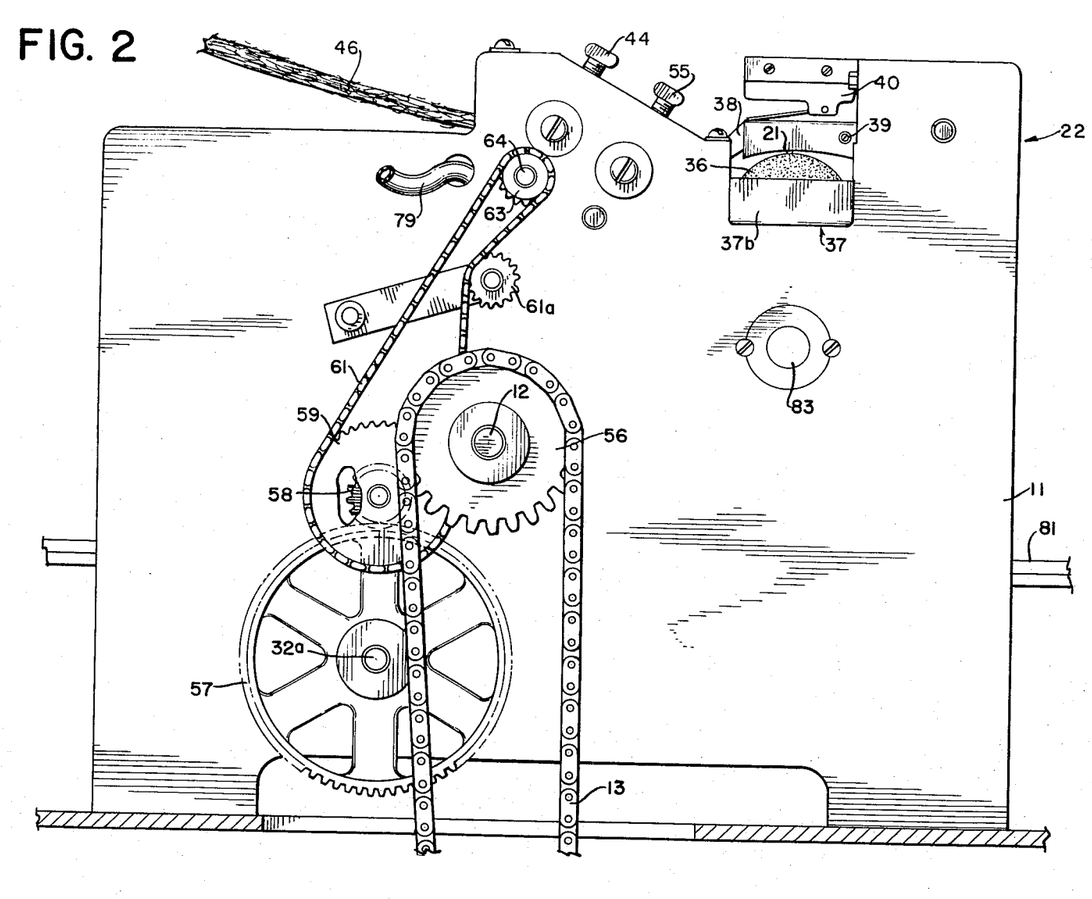
FIG. 2 shows the opposite side of the machine of FIG. 1.

FIG. 2 is a view of the opposite side of the machine from that shown in FIG. 1. As seen in FIG. 2, the drive chain 13 operates a sprocket 56 on the main drive shaft 12. The driving connections between shaft 12 and other rollers and shafts, including shaft 32, has heretofore been described. Shaft 32a shown in FIG. 2 is aligned with shaft 32 but is referred to as the braked shaft because its rotation is periodically interrupted. This shaft has a gear 57 which meshes with another gear 58 connected to a sprocket wheel 59 to drive a chain 61. As the shaft 32a moves intermittently, the chain 61 will also have an intermittent motion and will impart this intermittent motion to a sprocket 63 attached to a shaft 64 on which the roller 42 of FIG. 1 is mounted. A tension-adjuster sprocket 61a keeps the chain 61 properly taut. FIG. 2 also describes the container 66 of glue for a wheel 67 by coating the other end of each of the sticks 21.

Figure 3:
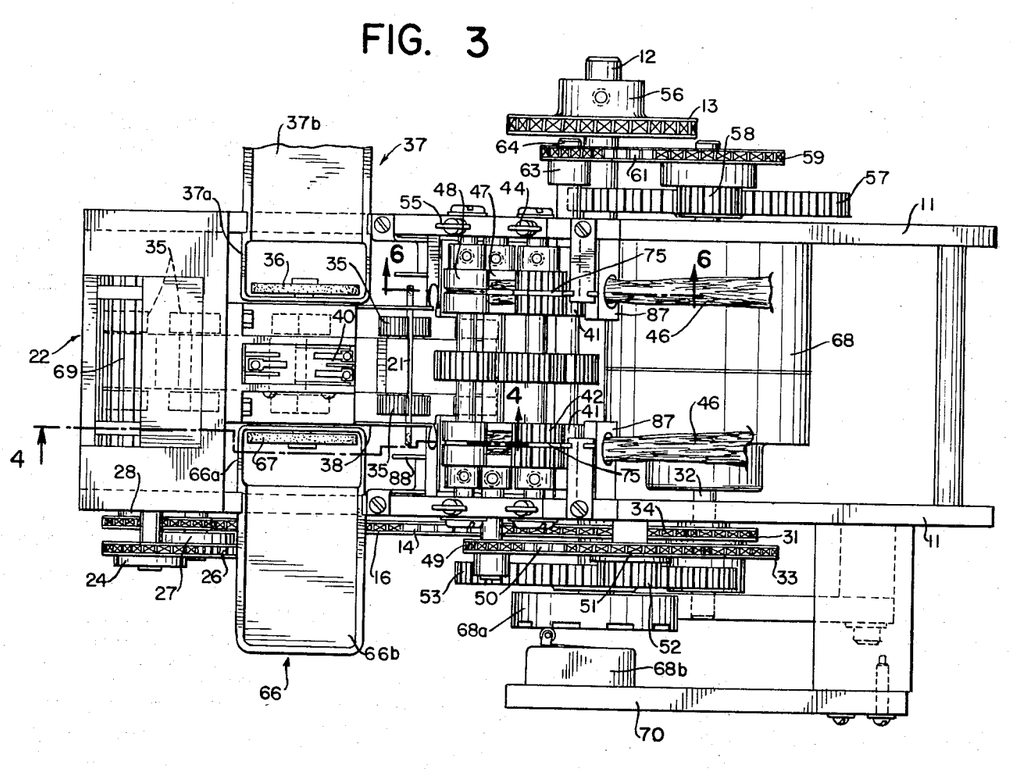
FIG. 3 is a top view of the machine of FIGS. 1 and 2.

FIG. 3 is a top view of the driving mechanism of the machine of the present invention. As shown, one of the elements is an electromagnetic brake 68 which controls the operation of the shaft 32a and is, in turn, operated by a cam 68a and a switch 68b mounted on a pivoting support 70 to change the timing of the brake 68, thereby changing the tufts of cotton. The connection, by way of the gear 57 and the gear 58 through the sprocket wheel 56 and the chain 61 to the sprocket wheel 63 and the shaft 64, is clearly shown. Also shown is a top view of the glue containers 38 and 66 and the wheels 37 and 67 rotating therein.

Figure 4:
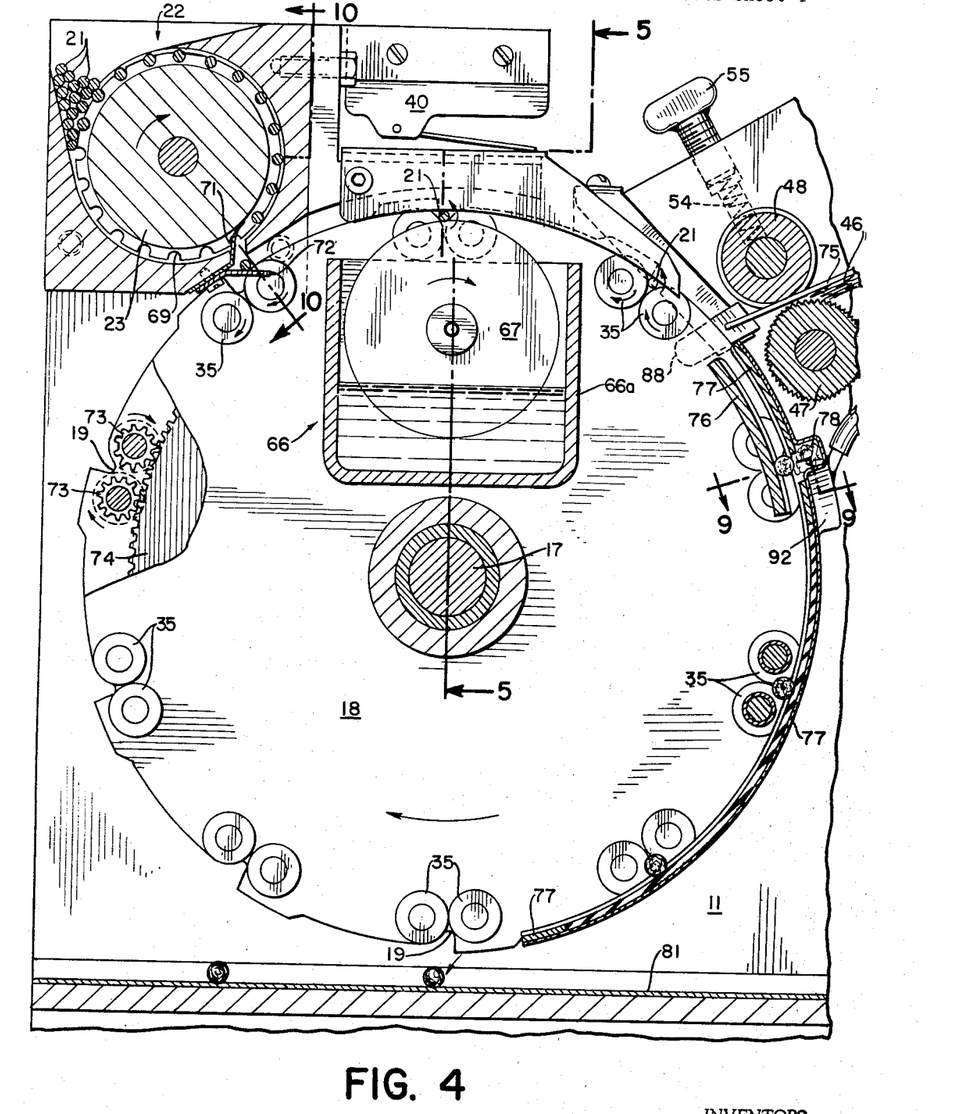
FIG. 4 is a detailed drawing of the rotary member of the machine.

FIG. 4 shows the rotary member 18 in great detail. A hopper 22 carrying a loose supply of sticks 21 is disposed adjacent the rotary member. A wheel 23 which has a number of recesses 69 in its periphery to receive the individual sticks 21 is located within the hopper. It is not essential that each of the recesses 69 picks up a stick 21 from the loose supply, provided enough of the recesses pick them up to supply one for each recess 19 in the rotary member 18. In order to remove the sticks 21 from the recesses 69 and to have them available for the recesses 19 in the member 18, a pair of fingers 71, one at each end of the sticks, brushes the sticks out of the recesses 69 as the wheel 23 rotates. The sticks 21 then drop onto a supporting flange 72 until the arrival of the next recess.

The adjacent rollers 35 do not contact with each other. They are preferably knurled in order to insure rotation of the sticks 21 and are themselves rotated by pinion gears 73 driven by a large central gear 74. The rotary motion thus imparted to the sticks 21 in the first instance causes the ends of the sticks to be completely coated with glue as they move across the surface of the wheels 36 and 67. Thereafter, the rotating sticks are carried around and, at a position adjacent to a pair of wires 75, which act as guides, they receive tufts of cotton 46 that pass between the rollers 47 and 48. These tufts are picked up by the glue on the sticks and are twisted about the sticks by the rotary motion imparted by the rollers 35.

Immediately after picking up the tufts of cotton, the sticks move between two sections 76 and 77 of a smooth channel. The section 77 has a recess for holding a sponge 78 which is kept moist by water from a pipe 79. The surfaces of both sections 76 and 77 are substantially friction free so as not to interfere with rotation of the sticks 21 caused by the rollers 35. After the cotton on the ends of the sticks 21 has been sufficiently formed, the sticks move away from the section 77 and the completed swabs fall off onto a conveyor 81.

Figure 5:
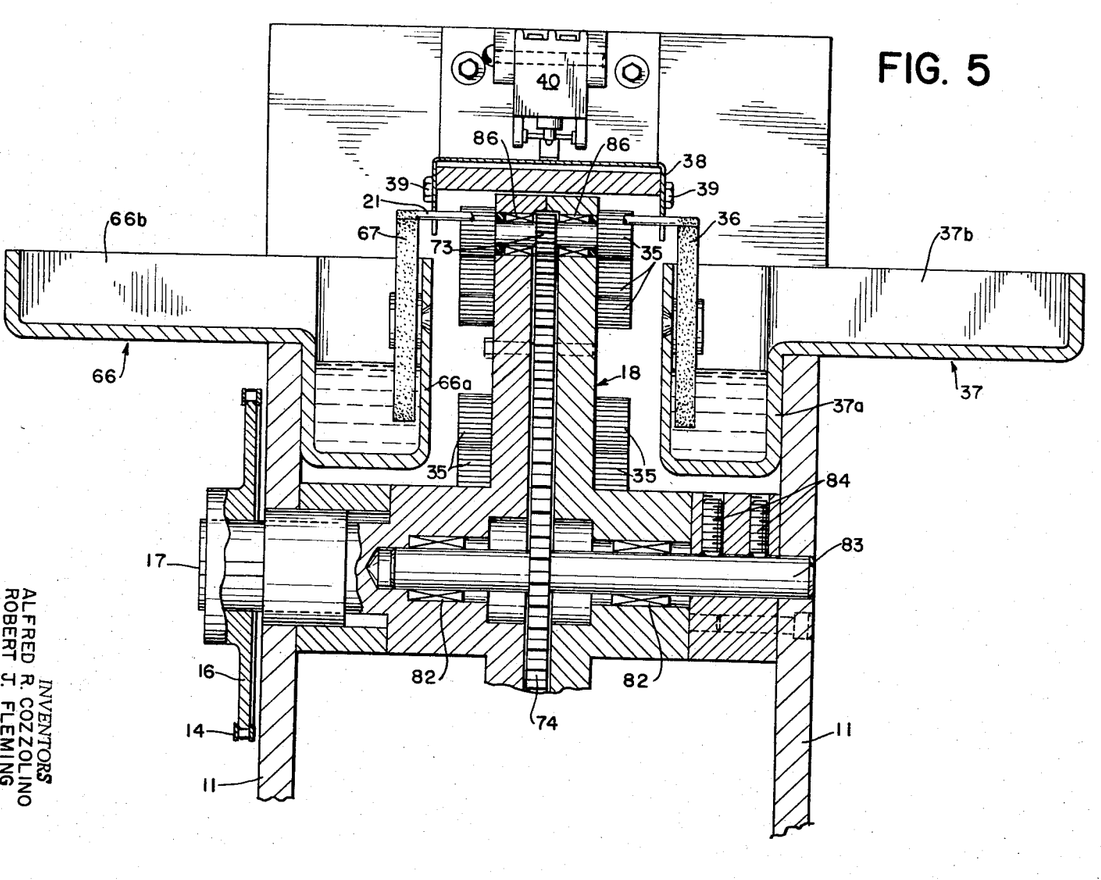
FIG. 5 is another cross-sectional view of a part of the machine showing particularly the means for applying glue to the ends of each stick.

FIG. 5 is an enlarged cross-sectional view of the member 18 and the means for coating the ends of the stick with adhesive. As may be seen, the member 18 is supported by bearings 82 on each side of the central gear 74. The latter does not rotate, but is rigidly affixed to a stationary bar 83 which also supports the bearings 82. The bar 83 is held in place by set screws 84.

Rotation of the rollers 35 about their own axes is produced by the engagement of the small pinion gears 73 with the stationary central gear 74. As the rotary member 18 causes the pinion gears to orbit around the main gear, the pinion gears roll forward thereby rotating the rollers 35. Each roller is supported for rotation in the rotary member 18 by means of journals, or bearings, 86.

Each of the swab sticks 21 rests upon the roughened or knurled surfaces of two pairs of rollers 35, one pair near each end of the stick. In FIG. 5 the stick 21 is shown as it passes across the surfaces of the smaller wheels 36 and 67 that apply glue to the sticks. These wheels are immersed in pools of glue in sections 37a and 66a of the containers 37 and 66, respectively. These containers are made with deep sections 37a and 66a and with shallow outward extensions 37b and 66b to permit more glue to be added while the machine is in operation, so as to keep the level high enough to provide an ample coating on the wheels 36 and 67.

Figure 6:
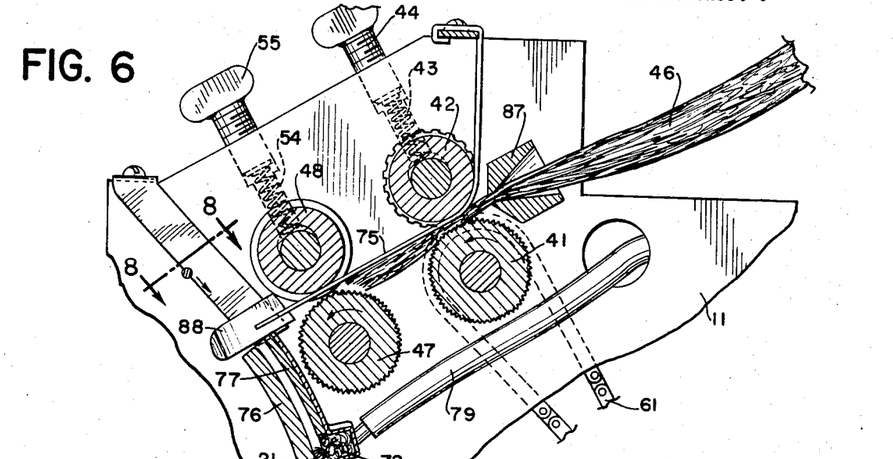
FIG. 6 is a detailed drawing showing the cotton feeding rollers in position to separate a tuft of cotton.
Figures 7, 8:
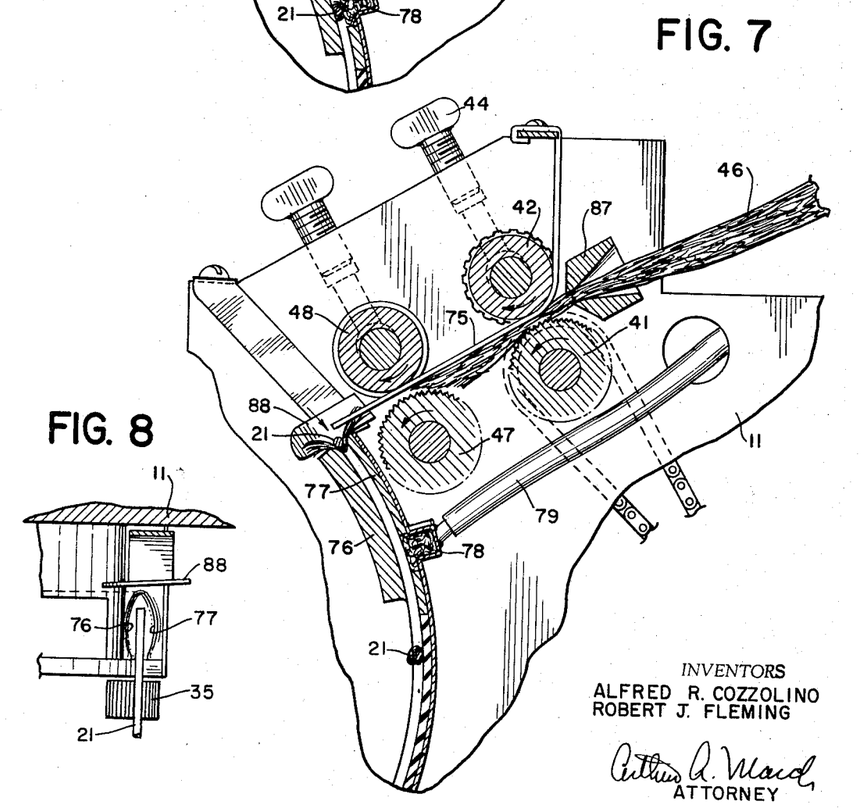
FIG. 7 shows the cotton feeding rollers operating to feed additional cotton.
FIG. 8 shows a section of the machine directed to positioning the end of the swab with respect to the forming die.

FIGS. 6 and 7 show enlarged views of the rollers that separate tufts of cotton from the strand 46 and apply these tufts to the sticks 21. As shown, the cotton enters the region of the rollers through a short funnel 87 to confine the cotton to a limited space. Thereafter the cotton comes into contact with a guide bar 75 which assists in directing the movement of the cotton strand 46 and of the tufts separated therefrom. The cotton is first picked up by the rollers 41 and 42 and is pinched between them so that as they rotate in opposite directions the cotton is carried along to the second pair of rollers 47 and 48. As has been explained, the rollers 47 and 48 rotate continuously and, therefore, as long as the strand of cotton 46 is in contact with the rollers 47 and 48 it will be pulled forward. However, the rollers 41 and 42 stop and start intermittently, and each time they stop the forward motion of the strand 46 is also stopped. The continued movement of the rollers 47 and 48 pulls off a tuft of cotton and, as is shown particularly in FIG. 7, pushes this tuft forward so as to be in the path of the next stick 21 as it is carried forward by the rollers 35.

The ends of the stick are covered with glue and may be sufficient in themselves to tear tufts of cotton off of the end of the strand 46 without the necessity of providing two pairs of rollers. However, it is preferable at times to utilize the intermittent and continuously rotating rollers to tear off precisely determined tufts from the strand of cotton 46.

According to the present invention the sticks 21 are rotating at all times in response to the engagement and rotation of the rollers 35 and, therefore, it is not necessary to cause the cotton to frictionally engage either of the sections 76 and 77 of the channel that forms the cotton into proper shape. These channel sections may preferably be formed out of plastic or coated with plastic so as to inhibit friction and permit the sticks to be rotated entirely by the rollers 35. This structure enables the swab to be formed with a completely even distribution of the cotton by a wiping action and without undesirable pressures or friction being exerted thereon. Another advantage of the structure of the present invention is that the aforesaid channels need not be too long because the sticks are being rotated more rapidly than they would be by any friction or pressure engagement with forming surfaces.

As the sticks 21 are carried by the member 18, they are preferably longitudinally aligned so that each maintains the same relative position approaching the channel, in order to insure the distribution of cotton at the terminals thereof. This may be accomplished by the guide 88 shown in FIG. 8 which is angularly disposed at this point to contact and align any sticks then out of proper position. A similar guide (not shown) may be provided adjacent to the other ends of the sticks.

Figure 9:
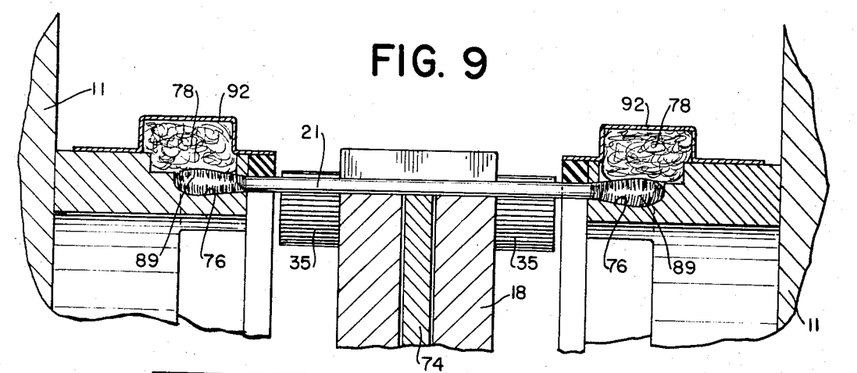
FIG. 9 shows a swab within the forming die.
Figures 10, 11, 12:
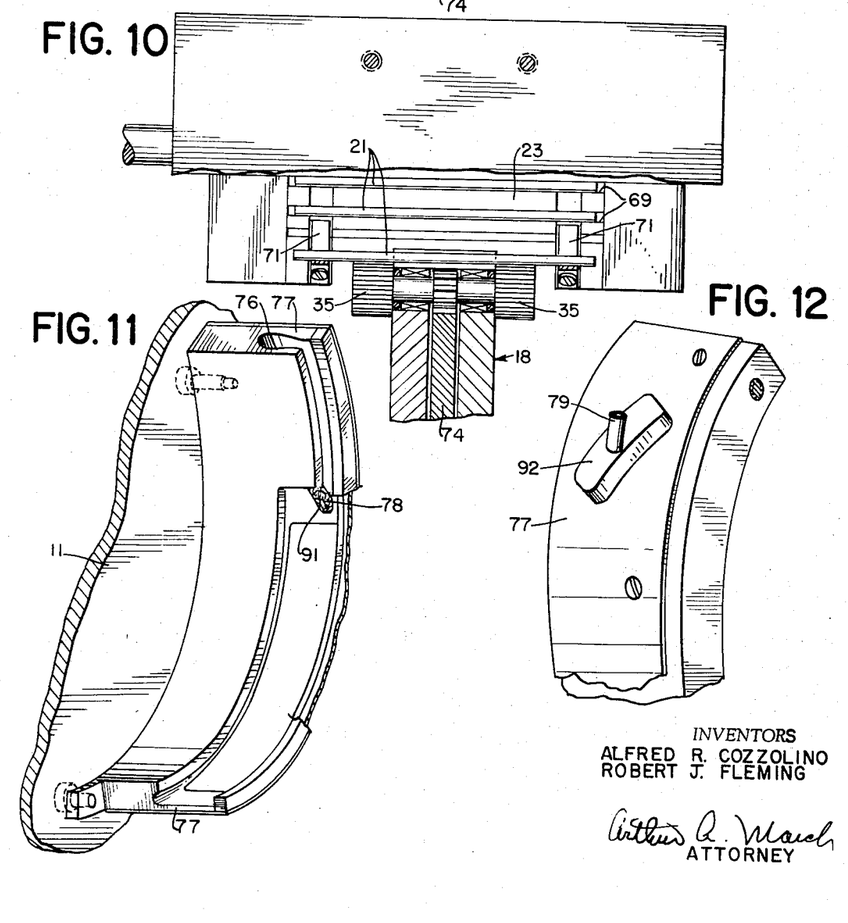
FIG. 10 shows a section of the stick supply wheel.
FIG. 11 is a perspective view of the front surface of one of the forming dies.
FIG. 12 is a view of the back of a part of the die of FIG. 11.

FIGS. 9, 11 and 12 show different views of the section of the machine at the point where the cotton swabs are formed. In FIG. 9 it will be seen that the cotton is formed into teardrop shaped swabs 89 at each end of each of the sticks 21 as the latter are rotated by the rollers 35 as hereinbefore described. FIG. 9 is a cross-section through the sponge 78 and, therefore, does not show the channel formed by sections 76 and 77.

FIG. 11 shows both of the sections 76 and 77 together with a portion of a slot 91 in which the sponge 78 is contained. As may be seen, the section 77 may be longer than the section 76, but one of the purposes of this extra length is simply to keep the finished swabs from falling away from the member 18 before they have reached the appropriate point.

FIG. 12 shows the back side of the section 76 in FIG. 11, including a receptacle 92 for holding one of the sponges. One end of the waterpipe 79 is connected to the receptacles.

FIG. 10 shows the manner in which the sticks 21 are fed from the supply wheel 23 to the upper roller portion 35 of the rotary member 18. As may be seen, the sticks fall into place directly in contact with the rollers 35 and, although it is shown in this figure as well as it is in FIG. 4, the sticks fit into the space between the pairs of rollers so as to engage both rollers of each pair.

The present invention provides apparatus which automatically produces a cotton swab provided with an even and complete distribution of cotton around the terminals of the sticks. Furthermore, as a result of the invention the cotton swabs may be produced at relatively high speeds without in any way detracting from the excellence of the resultant product.

It will be understood that the foregoing description with the details of exemplary structure is not to be construed in any way to limit the invention, but that modifications may be made thereto without departing from the scope of the invention as set forth in the following claims.

What is claimed is:

1. A swab making machine comprising: a rotary member provided with stick receivers for receiving swab sticks; means below the mouth of each of said receivers supporting each of said sticks in one of said receivers, respectively, and each said means rotating about an axis common with said rotary member to rotate each of said sticks independently about its longitudinal axis; means for moving said rotary member; means for applying an adhesive to one end of each of said rotating sticks for the attachment thereto of a strand of relatively loose fibrous tuft material; means for applying a fiber tuft of said material to the adhesive-coated ends of the sticks; and means for forming the tufts into swabs.

2. A swab making machine comprising: a rotary member provided with stick receivers for receiving swab sticks; means below the mouth of each of said receivers supporting each of said sticks in one of said receivers, respectively, and each said means rotating about an axis common with said rotary member to rotate each of said sticks independently about its longitudinal axis; means for moving said rotary member; means for applying an adhesive to one end of each of said rotating sticks for the attachment thereto of a tuft of relatively loose fibrous strand material; means for applying a fiber tuft of said material to the adhesive-coated ends of the sticks and means adjacent to said rotary member and located beyond the point of attachment to the sticks of the tuft of fibrous material for forming said tufts into swabs.

3. A swab making machine comprising: a rotary member provided with stick receivers for receiving swab sticks; means below the mouth of each of said receivers supporting each of said sticks in one of said receivers, respectively, and each said means rotating about an axis common with said rotary member to rotate each of said sticks independently about its longitudinal axis; means for moving said rotary member; means for applying an adhesive to an end of each of said rotating sticks for attachment thereto of a tuft of relatively loose fibrous strand material; means to detach a tuft of said material for application to the adhesive-coated end of each of said rotating sticks; and means adjacent to said rotary member and located beyond the point at which said tufts are attached to said rotating sticks for forming said tufts into swabs.

4. A swab making machine comprising: a rotary member provided with a plurality of pairs of rollers for receiving swab sticks; means for rotating said member and said rollers; a supply mechanism to deliver each of said sticks to the surface of a pair of said rollers whereby each of said sticks is rotated by the pair of rollers with which it is in contact; means for applying an adhesive to an end of each of said rotating sticks; means to detach a tuft of strand material for attachment to the adhesive-coated end of each of said rotating sticks; and a channel having juxtaposed surfaces adjacent to said rotary member and located beyond the point at which said tufts are fed to said rotating sticks for forming said tufts into swabs.

5. A swab making machine comprising: a rotary member provided with a plurality of rollers spaced in pairs around its periphery; means for rotating said member and each of said rollers in the same direction; a supply mechanism to deliver swab sticks one at a time to the space between the two rollers of each pair and in frictional engagement with both rollers of the respective pair to be rotated thereby as said rollers rotate; means for applying an adhesive to an end of each of said rotating sticks; means to detach a tuft of strand material for attachment to the adhesive-coated end of each of said rotating sticks; and means adjacent to said rotary member and located beyond the point at which said tufts are attached to said rotating sticks for forming said tufts into swabs.

6. A swab making machine comprising: a rotary member provided with pairs of stick receiving rollers spaced around its perimeter for receiving swab sticks and simultaneously rotating each of said sticks about its longitudinal axis; means for rotating said member and said rollers including a fixed central gear coaxial with said rotary member; a pinion coaxial with each of said rollers engaging said central gear to rotate the respective roller as said rotary member turns; a supply mechanism to deliver said sticks to said stick-receiving rollers; means for applying an adhesive to one end of each of said rotating sticks; means to detach a tuft of strand material for attachment to the adhesive-coated end of each of said rotating sticks; and a friction-free channel adjacent to said rotary member and located beyond the point at which said tufts are fed to said rotating sticks for forming said tufts into swabs.

7. A swab making machine comprising: a rotary member provided with a plurality of rollers spaced in pairs around its periphery; means for rotating said member and each of said rollers in the same direction including a fixed central gear coaxial with said rotary member; a pinion on each of said rollers meshed with said central gear for rotating said rollers; a supply mechanism to deliver each of said sticks to the surface of a pair of rollers whereby each of said sticks is rotated by the pair of rollers with which it is in contact; means for applying an adhesive to one end of each of said rotating sticks; means to detach a tuft of strand material periodically for attachment to the adhesive-coated end of each of said rotating sticks; and a channel having juxtaposed surfaces adjacent to said rotary member and located beyond the point at which said tufts are fed to said rotating sticks, said tufts on said rotating sticks being shaped by said juxtaposed surfaces in passing therebetween.

8. A swab making machine comprising: a rotary member provided with a plurality of notches around its periphery and a corresponding plurality of pairs of rollers spaced around the periphery of said member and rotatably mounted thereon with the peripheral of each pair of said rollers extending above the bottom of each of said notches and on either side thereof; means for rotating said rotary member including a fixed central gear coaxial with said rotary member; a pinion attached to each of said rollers and meshing with said central gear for rotating each of said rollers in the same direction as said rotary member rotates; a supply mechanism to deliver swab sticks one at a time to the space between the two rollers of each pair and in frictional engagement with both rollers of the respective pair to be rotated thereby as said rollers rotate; means for applying an adhesive to one end of each of said rotating sticks; means to detach a tuft of strand material periodically for attachment to the adhesive-coated end of each of said rotating sticks; and a channel adjacent to said rotary member and located beyond the point at which said tufts are fed to said rotating sticks; said tufts on said rotating sticks being moved through said channel and shaped thereby.

9. A swab making machine comprising: a rotary member provided with a plurality of rollers spaced in pairs around its periphery; means for continuously rotating said member and each of said rollers in the same direction; a supply mechanism to deliver swab sticks one at a time to the rollers of a respective pair to be rotated thereby as said rollers rotate; an applicator wheel tangent to the path of one of the ends of said sticks; an adhesive cup; said applicator wheel rotating partially immersed in an adhesive in said cup whereby said applicator wheel picks up adhesive and applies same to said one end of said rotating sticks; means to detach a tuft of strand material for attachment to the adhesive-coated end of each of said rotating sticks; and a channel adjacent to and concentric with said rotary member and located beyond the point at which said tufts are applied to said rotating sticks; said tufts on said rotating sticks being shaped by said channel.

10. A swab making machine comprising: a rotary member provided with stick receivers; rotating means near the periphery of said member and below the mouth of each of said receivers supporting each of said sticks in one of said receivers, respectively, and each of said means rotating about an axis common with said rotary member to rotate each of said sticks independently about its longitudinal axis; a supply mechanism to deliver said sticks to said rotating means; means for applying an adhesive to one end of each of said rotating sticks; a first pair of rollers between which a strand of relatively loose cotton passes; a second pair of rollers between said first pair of rollers and said rotary member; driving means for said second pair of rollers; intermittent driving means for said first pair of rollers to interrupt periodically the rotation of said first pair of rollers to cause said second pair of rollers to detach a tuft of said cotton periodically and feed it to the adhesive-coated end of one of said rotating sticks; and a die surface adjacent to said rotary member and located beyond the point at which said tufts are fed to said rotating stick for forming said tufts into swabs.

References Cited

UNITED STATES PATENTS

| | | | |
|---|---|---|---|
| 1,721,815 | 7/1929 | Gerstenzang | 19—145.3 |
| 2,618,027 | 11/1952 | Barber et al. | 19—145.3 |
| 2,705,009 | 3/1955 | Plantinga et al. | 128—269 |

ROBERT R. MACKEY, *Primary Examiner.*